(12) United States Patent
Van Kooten et al.

(10) Patent No.: US 8,079,425 B1
(45) Date of Patent: Dec. 20, 2011

(54) MODULAR AND TOWABLE FARM IMPLEMENT

(76) Inventors: Craig Van Kooten, Lynden, WA (US);
Brian Johnston, Lynden, WA (US)

( * ) Notice: Subject to any disclaimer, the term of this patent is extended or adjusted under 35 U.S.C. 154(b) by 184 days.

(21) Appl. No.: 12/468,371

(22) Filed: May 19, 2009

Related U.S. Application Data

(60) Provisional application No. 61/128,169, filed on May 20, 2008.

(51) Int. Cl.
*E02F 3/76* (2006.01)
*A01B 49/02* (2006.01)

(52) U.S. Cl. .................... 172/799.5; 172/133

(58) Field of Classification Search ......... 172/310, 172/311, 196, 219, 452, 456, 286, 724, 720, 172/740, 776, 482, 272, 395, 799.5, 684.5, 172/133, 145, 149, 151; 171/141; 414/680; 280/416.1, 416.2, 414.5, 400
See application file for complete search history.

(56) References Cited

U.S. PATENT DOCUMENTS

| | | | |
|---|---|---|---|
| 3,608,645 A * | 9/1971 | Meiners | 172/491 |
| 5,641,026 A * | 6/1997 | Balmer | 172/452 |
| 5,746,275 A | 5/1998 | Cross et al. | |
| 5,829,536 A | 11/1998 | Pigg et al. | |
| 6,796,384 B1 | 9/2004 | Potter | |
| 7,036,604 B2 * | 5/2006 | Steinlage et al. | 172/452 |
| 7,100,704 B2 | 9/2006 | Potter | |

OTHER PUBLICATIONS

Article found at: http://www.lawnmowers-uk.co.uk/cat12_1.htm.
Article found at: http://www.swisherinc.com/hitch.asp Mar. 31, 2009.
Product Data Sheet of Actuator LA36 by Techline, http://www.techline.linak.com/.

* cited by examiner

*Primary Examiner* — Robert E Pezzuto
(74) *Attorney, Agent, or Firm* — Dwayne E. Rogge; Hughes Law Firm, PLLC

(57) ABSTRACT

A towable farm and garden implement trailer which has a modular receiver. The modular receiver is operatively configured to receive implements above or below the frame of the trailer. Implements which may be removably coupled to the underside of the trailer include such implements as a lawn de-thatcher, transport box, box blade, drag harrow, slurry blade, etc. Examples of implements which could be carried and removably coupled to the top side of the trailer frame include such implements as a spreader, tank, carrying platform and other similar implements. In one form, the implement trailer comprises an actuator positioned between the frame and the wheels to allow the wheels to be raised and lowered with respect to the trailer frame.

11 Claims, 17 Drawing Sheets

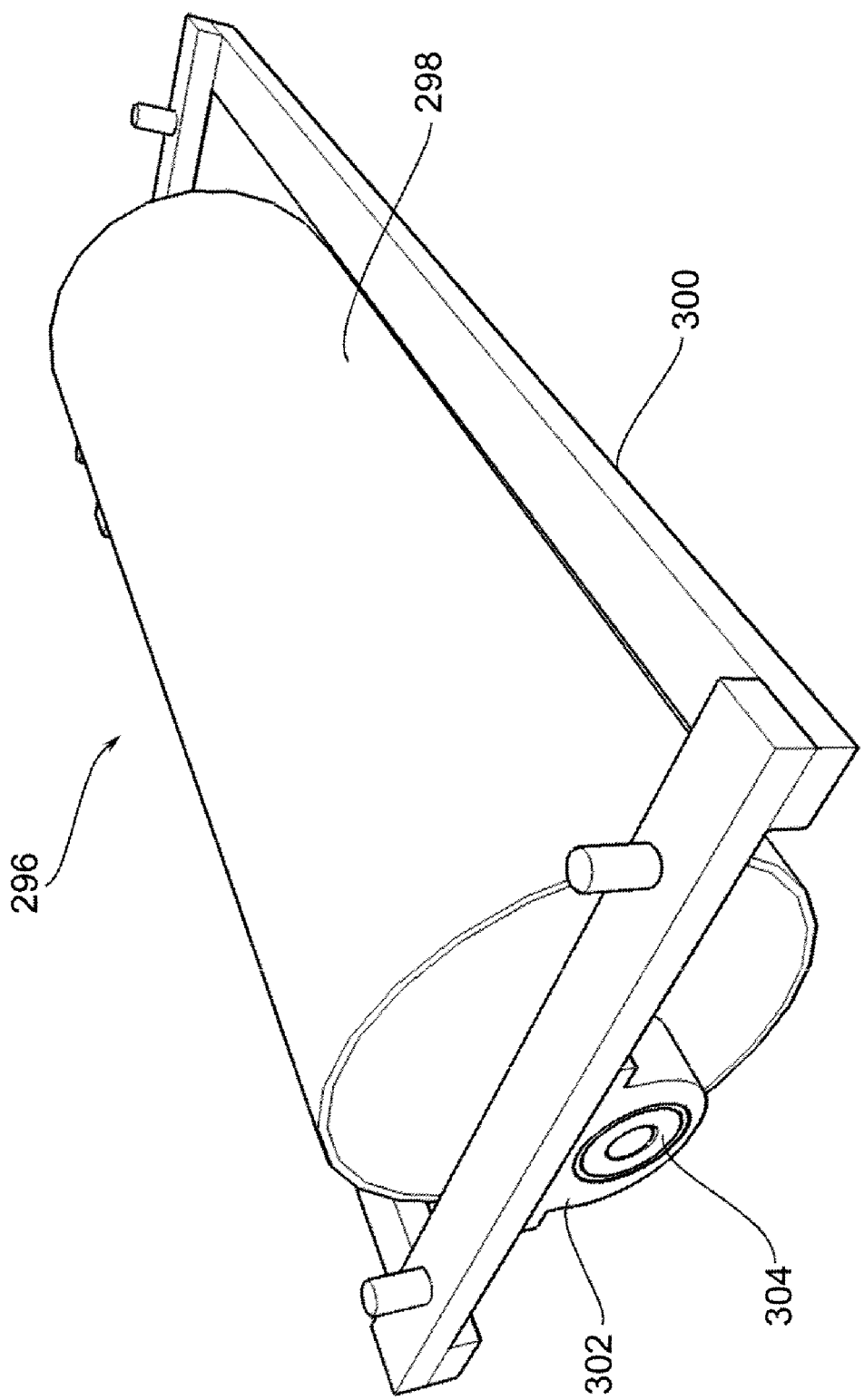

MODULAR AND TOWABLE FARM IMPLEMENT

RELATED APPLICATIONS

This application claims priority benefit of U.S. Ser. No. 61/128,169, filed May 20, 2008 incorporated herein by reference.

BACKGROUND OF THE DISCLOSURE

This disclosure generally relates to a towable farm and garden implement trailer which has a modular receiver. The modular receiver is operatively configured to receive implements above or below the frame of the trailer. Implements which may be removably coupled to the underside of the trailer include such implements as a lawn de-thatcher, transport box, box blade, drag harrow, slurry blade, etc. Examples of implements which could be carried and removably coupled to the top side of the trailer frame include such implements as a spreader, tank, carrying platform, rototiller, mower, chipper, and other similar implements. In one form, the implement trailer comprises an actuator positioned between the frame and the wheels to allow the wheels to be raised and lowered with respect to the trailer frame.

SUMMARY OF THE DISCLOSURE

Described herein is a modular implement trailer which in one form comprises a hitch which is operatively configured to couple to a vehicle. To facilitate use, a trailer frame coupled to the hitch; and a plurality of trailer wheels are positionably coupled to the trailer frame. A modular receiving unit portion of the frame is disclosed, wherein the modular receiving unit in one form is operatively configured to fixedly and removably couple various independent implements to the trailer frame. In one embodiment, the modular receiving unit is positioned between the hitch and the trailer wheels; and a height adjustment system may be operatively configured to allow a user to adjust the height between the trailer frame adjacent to the trailer wheels, and the lowermost position of the trailer wheels.

As disclosed in one form, the height adjustment system previously mentioned comprises an actuator having a first end coupled to the frame, and a second end of the actuator coupled to the trailer wheels. This actuator in one form comprises a remote control unit coupled to the actuator and operatively configured to control the actuator, wherein the remote control unit is positionable to be controlled by a user upon the vehicle. This allows the user to control the height of the trailer while driving the vehicle. This actuator may be one of many different types, and may further comprise a power supply such as, for example, a battery, which is in turn coupled to the trailer frame and operatively configured to allow use of the actuator independently from the vehicle. Thus the actuator and powered implements can be used even when the trailer is not coupled to a vehicle.

The modular implement trailer, as previously mentioned, may further comprise a latching assembly, coupled to the frame, and operatively configured to fixedly and removably couple an implement to the frame. In one form this latching assembly is operatively configured to receive implements on a bottom and a top portion of the frame. This provides for implements like box blades and harrows to be attached under the frame, and other implements like sprayers and the like to be mounted to the top of the frame. In one form, to protect the latching assembly, the latching assembly is substantially positioned within the frame.

The modular implement trailer as disclosed utilizes implements such as, for example, a spreader, cultivator, box blade, aerator, slurry blade, thatcher, harrow, roller, or tank sprayer.

A novel design for a thatcher is disclosed which in one form comprises a plurality of removable and replaceable tines, and a sub frame which is operatively configured to removably couple to the previously described trailer frame. In one form, the sub frame comprises at least one alignment groove for each tine.

A novel design for a drag harrow is disclosed, which in one form comprises a sub frame operatively configured to removably couple to the previously described trailer frame. A harrow frame is disclosed which is operatively configured to removably couple to the sub frame; wherein the harrow frame comprises a plurality of harrow studs extending from the harrow frame. These harrow studs in one form comprise: a median connective portion coupled to the harrow frame; a plurality of short extensions extending substantially perpendicular in a first direction; a plurality of long extensions extending in a second direction (the second direction being opposite the first direction); and the harrow frame, which in one form is operatively configured to extend either the short extensions or the long extensions from the harrow.

A novel latching system for a modular implement trailer is also disclosed. The latching system in one form comprises: a trailer frame, a latch handle and a tension member, such as for example a compression spring, which is coupled to the latch handle. The latching system may also be arranged such that the tension member is operatively configured to maintain the latching system in a locked orientation until re-positioned by a user. In one embodiment, a bushing comprising a first surface defining a void operatively configured to receive a portion of an implement is utilized, wherein the bushing is fixedly coupled to the trailer frame. The bushing may further comprise a second surface defining a void which is perpendicular to the first surface defining a void, such that the second surface defining a void is operatively configured to receive a portion of the latch handle. The latching system is operatively configured to fixedly couple the implement to the trailer frame as the portion of the implement is positioned within the first surface defining a void, and the handle is positioned within the second surface defining a void.

A novel drag harrow implement is also disclosed. The drag harrow implement in one form comprises a main frame and a reversible sub frame removably coupled to the main frame and substantially defining a horizontal plane. In one form a plurality of harrow studs extend perpendicular to the horizontal plane in a first upward direction and in a second downward direction. The vertical midline of the harrow studs is offset from the vertical midline of the sub frame. This can be accomplished by several methods, including providing studs having a different length in a first vertical direction than in a second vertical direction, or by attaching the studs offset from the vertical midline of the sub frame.

BRIEF DESCRIPTION OF THE DRAWINGS

FIG. 17 is an isometric view of a roller implement configured to couple to a modular implement trailer in one form.

DESCRIPTION OF THE PREFERRED EMBODIMENTS

Figure 1:
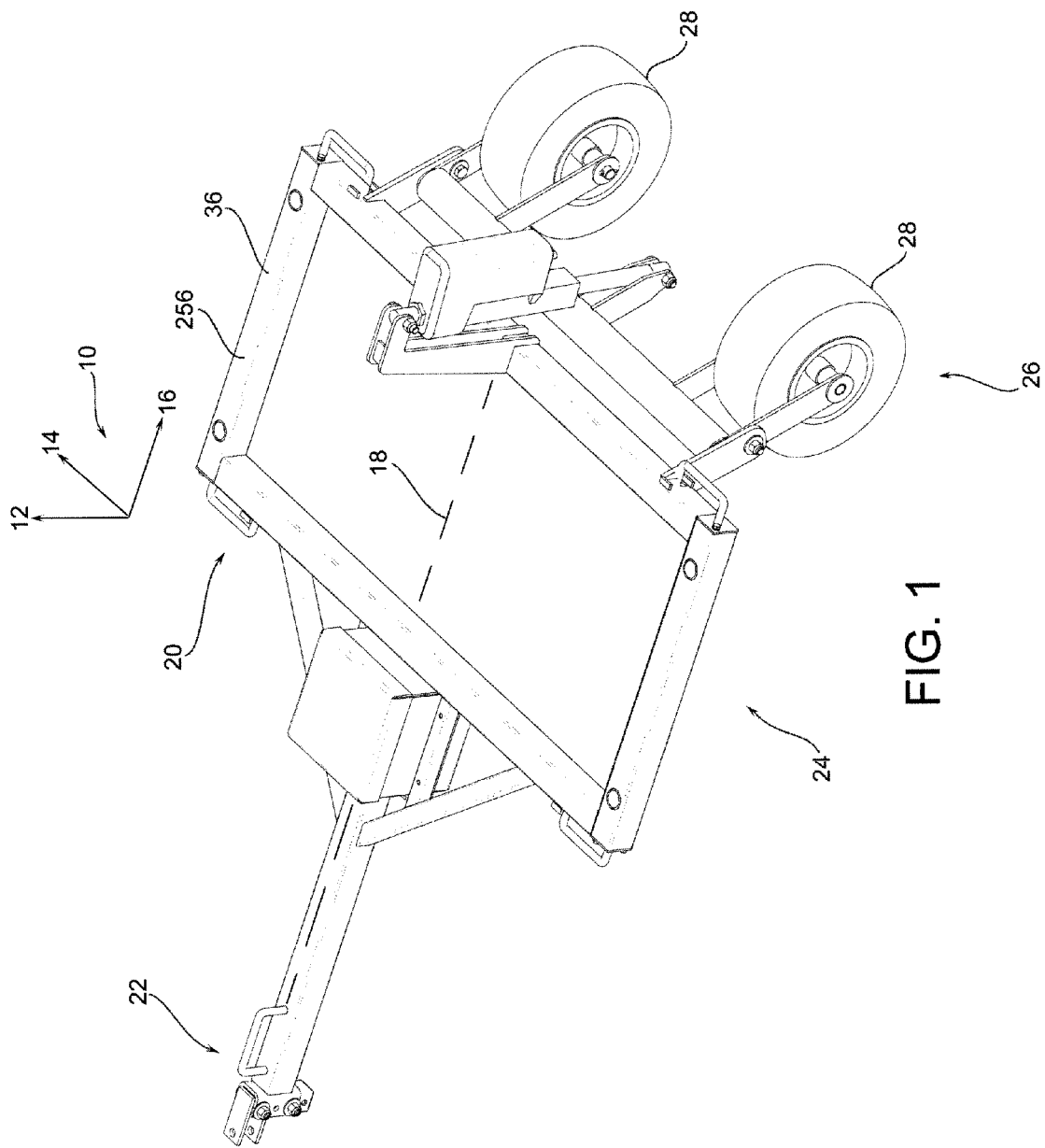
FIG. 1 is an isometric top view of a modular implement trailer in one form.

Before beginning a detailed description, an axes system 10 is disclosed and shown in FIG. 1. This axes system 10 comprises a vertical axis 12, a transverse axis 14, and a longitudinal axis 16. In one form, the modular implement trailer has bilateral symmetry through a longitudinal axis 18. These axes are designed to aid in understanding of the description, and are not intended to be limiting.

Looking to FIG. 1, a modular implement trailer 20 is shown in one form. In general, the trailer 20 comprises three major systems. The first system comprises a hitch system 22 which is configured to couple the trailer 20 to a vehicle. The term vehicle is used based on a definition found in the Random House dictionary: "Any means in or by which someone travels or something is carried or conveyed." This includes lawn and garden tractors, riding lawn mowers, ATVs, and could also incorporate animals such as draft horses, oxen, and the like. As the ATVs are becoming more and more prevalent upon smaller farms and many golf courses etc., the trailer 20 is particularly well-suited to these vehicles. The second system is a frame system 24 which will be described in much more detail. The third system is a support system 26 comprising at least one wheel 28.

Figure 2:
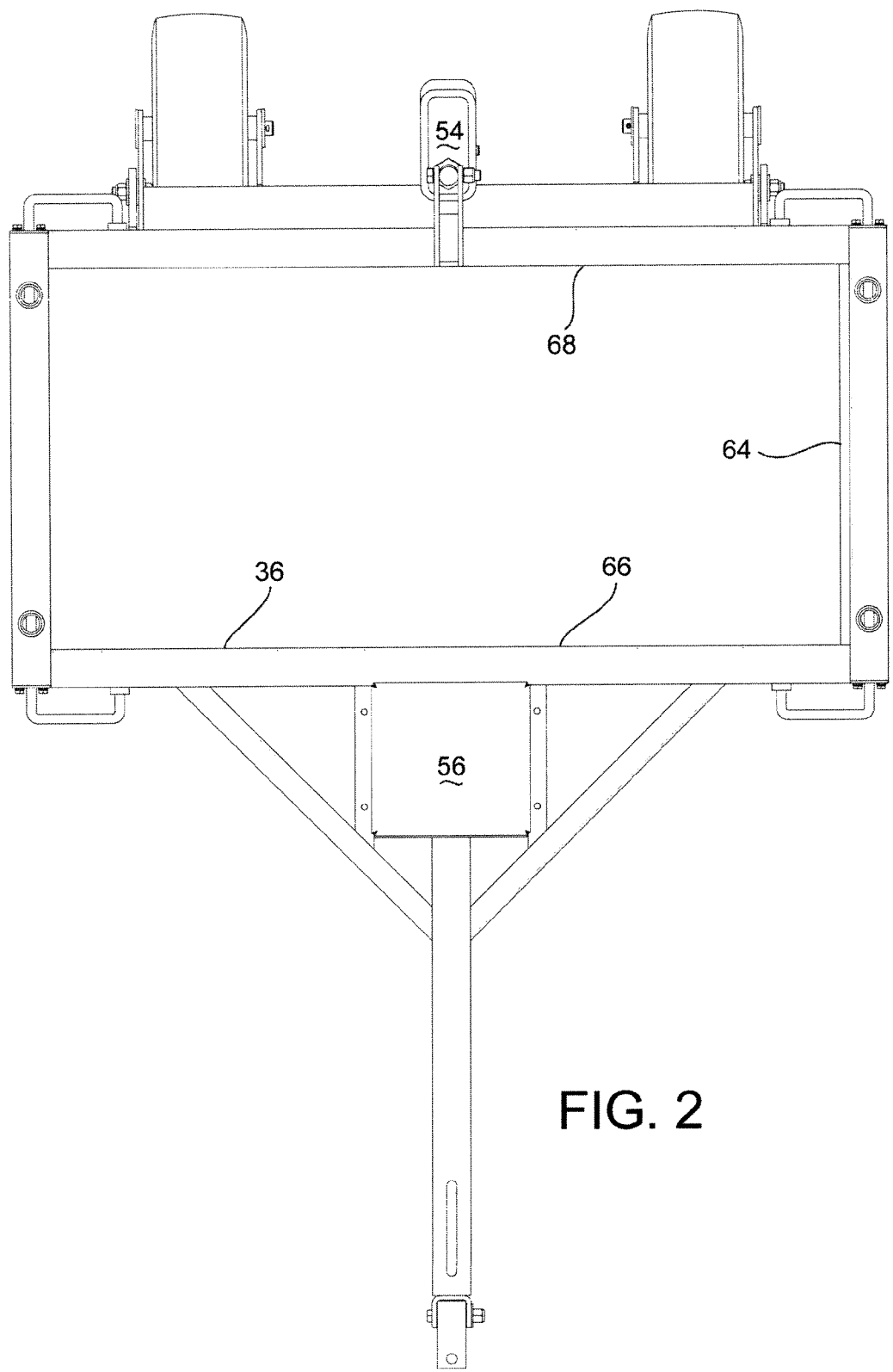
FIG. 2 is a plan view of a modular implement trailer in one form.
Figure 3:
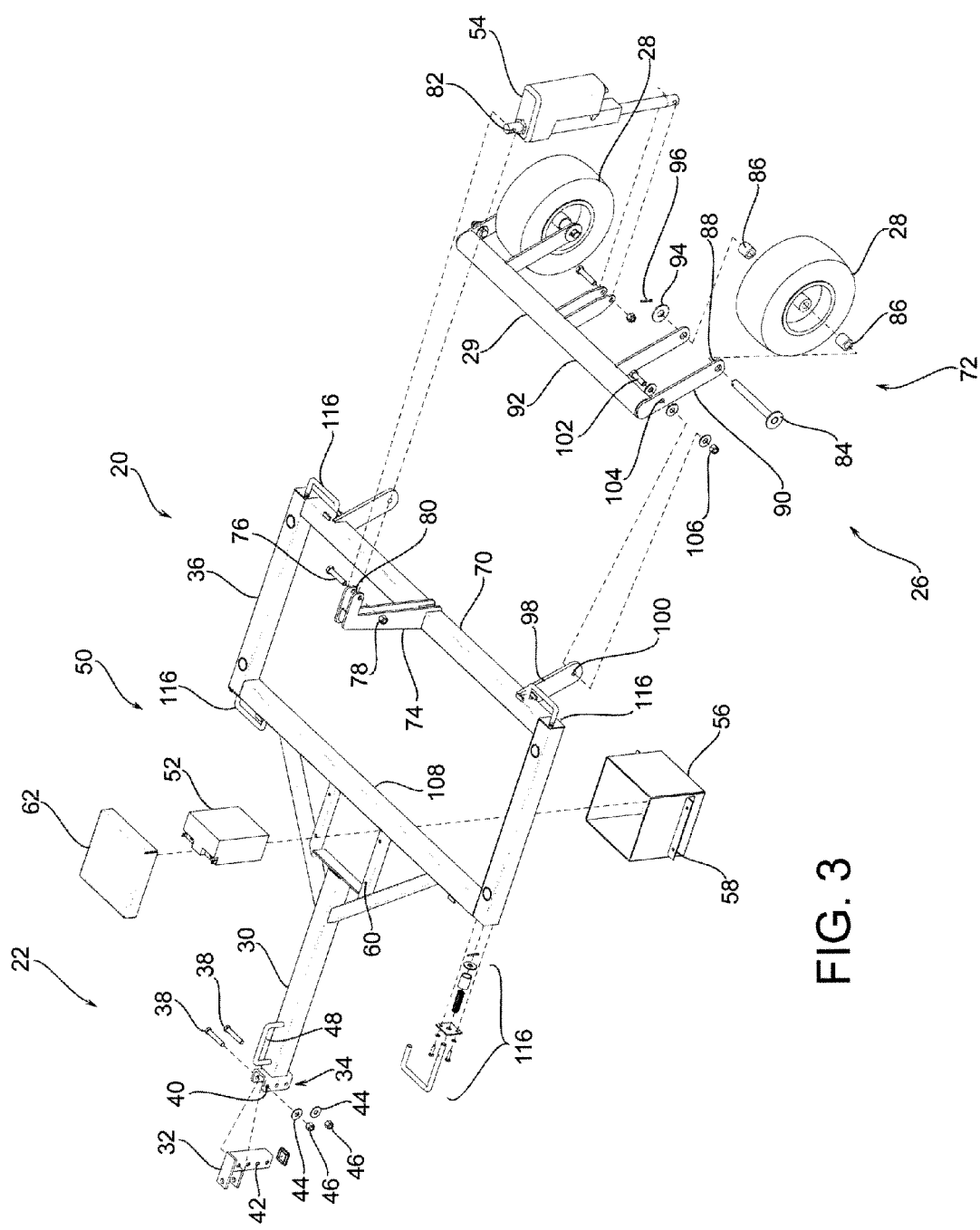
FIG. 3 is an exploded isometric view of a modular implement trailer in one form.

Looking to FIG. 3, there is an exploded view of many of the parts of a modular trailer 20 in one form. At the forward end 30 is the hitch system 22 previously described. While many hitches could be utilized, such as a ball receiver, pintle hitch, harness for a draft animal, or other connective hitches, by way of example, a single point receiver 32 is shown comprising a height adjustment system 34 which is utilized by connecting the receiver 32 to the forward end 30 of the frame 36. In one form, pins 38 are pressed through holes 40 in the forward end 30 and also through holes 42 in the receiver 32 and held in place by washers 44 and nuts 46 or an equivalent structure. This maintains the receiver 32 at the desired height for connectivity to the vehicle (not shown). A lifting handle 48 may be utilized to assist and attach the receiver 32 to the vehicle and also for manipulating the trailer 20 by hand. As the overall weight, size and arrangement of the trailer 20 is relatively small, a single user should normally be able to locally reposition the trailer 20 as desired. In one form, an independent power supply 50 may be utilized, comprising a battery 52 configured to drive an actuator 54, the use of which will be described in more detail later on. The battery 52 may be held in place by a battery box 56 bolted to the frame 36 through a plurality of holes 58 in the battery box and holes 60 in the trailer frame 36. Obviously, the battery box 56 could be mounted by other means, such as welding, etc. A battery box lid 62 may also be included to protect the battery 52 and other elements within the battery box 56 from dirt, water, and other foreign objects. Looking to FIG. 2, a chase 64 may be provided to protect any wiring extending between the battery box 56 and the actuator 54. The wiring also may be run through portions of the frame 36, such as through a forward transverse member 66 and an aft transverse member 68.

At the aft end 70 of the trailer 20 shown in FIG. 3 is the support system 26, including a height adjustment system 72. In one form, the support system 26 comprises an actuator post 74 coupled to or formed as a portion of the frame 36. An attachment device, such as a pin 76 and nut 78, pass through a hole 80 in the post 74 for attachment to the actuator 54 by a way of a hole 82 provided in the actuator 54. As shown, the trailer 20 comprises a plurality of wheels 28, although it is conceived that the apparatus could be utilized with one or more wheels 28. The wheels 28 are coupled to the frame 36 in one form by way of an axle 84 which passes through a plurality of bushings 86 and also through holes 88 in a suspension post 90, which may be rigidly coupled to a crossmember 92 which connects the plurality of wheels 28. The axle 84 may be held in place by attachment mechanisms such as a washer 94 and pin 96. The crossmember 92 is coupled to the trailer frame 36 in one form by way of a standoff 98 having a hole 100 configured to receive a pin 102, which passes through a hole 104 in the suspension post 90 and is held in place by a washer and nut 106. This allows the crossmember 92 to rotate about the pin 102 with respect to the frame 36. In this arrangement, as the crossmember 92 rotates, the distance in the vertical direction 110, shown in FIG. 4, between the underside 108 of the trailer frame 36 and the lowermost portion 112 of the wheel 28 can be adjusted. This is useful to accommodate the varying thicknesses of the implements mounted to the trailer 20, as will be described in detail later on.

Figure 4:
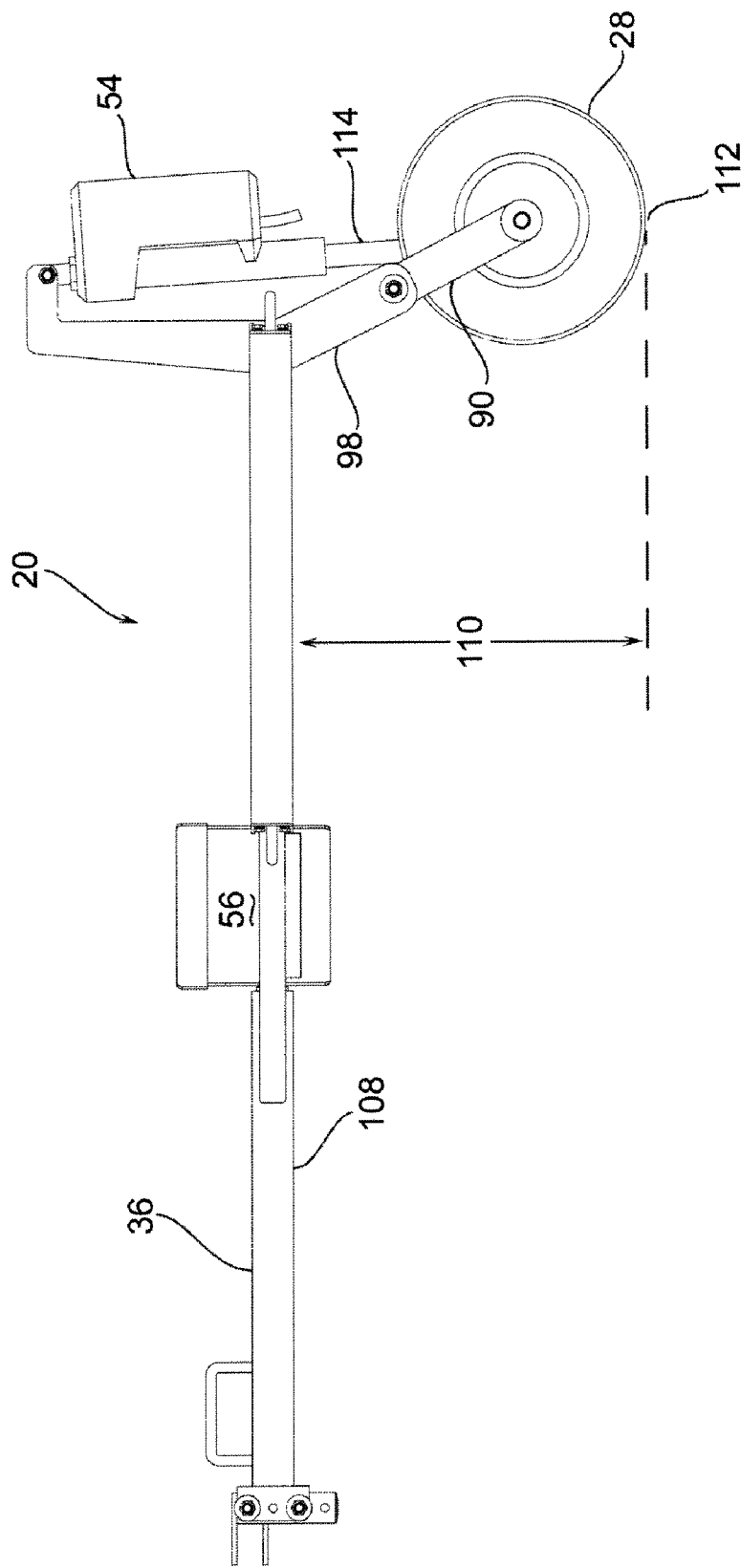
FIG. 4 is a side view of a modular implement trailer in one form, in a raised configuration.

Looking now to FIG. 4, the trailer 20 is shown in a substantially raised orientation having a raised distance 110 between the underside 108 of the trailer frame 36 and the lowermost portion 112 of the wheel 28. This can be compared to FIG. 5, which shows the trailer 20 in a substantially lowered orientation having a lowered distance 118 between the underside 108 of the trailer frame 36 and the lowermost portion 112 of the wheel 28. Looking back to FIG. 4, it can be seen how the actuator 54 is extended as shown at 114, and in one form the suspension post 90 is substantially in line with the standoff 98. Once again, compare this to FIG. 5, wherein it can be assumed that the actuator 54 is in a retracted orientation and the suspension post 90 is substantially orthogonal with the standoff 98. In this lowered orientation, a roller 29, on the crossmember 92, may be in contact with the ground and roll thereupon.

Figure 11:
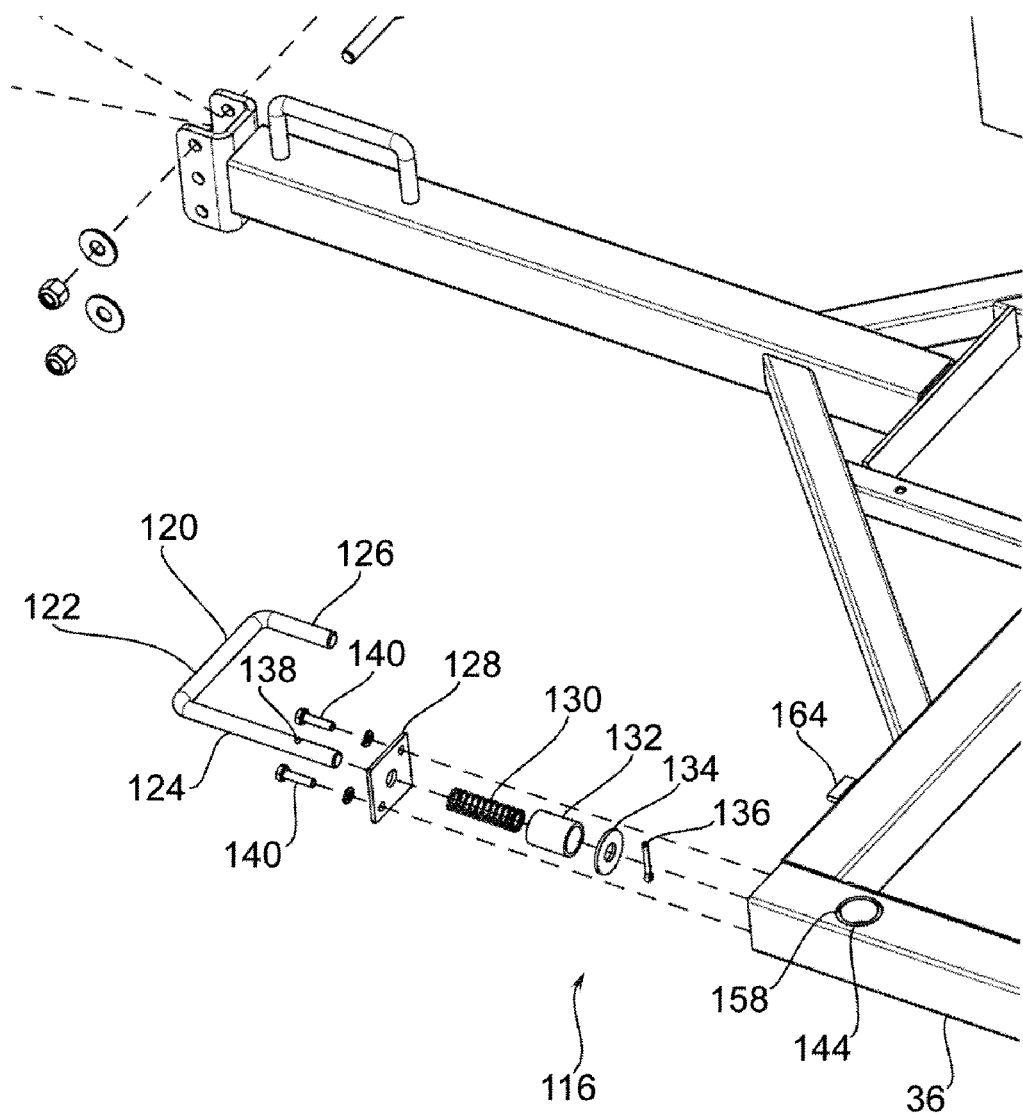
FIG. 11 is a detail view of a latching assembly configured to interoperate with a modular implement trailer in one form.
Figure 12A:
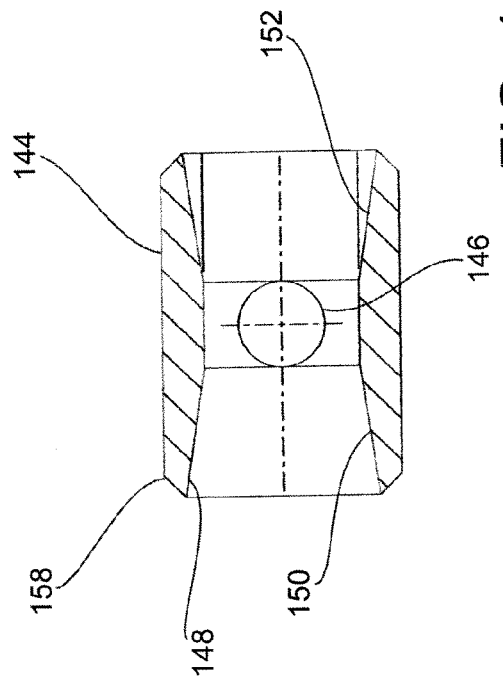
FIG. 12A is a detail cutaway view of a bushing forming a portion of the latching assembly in one form.
Figure 12B:
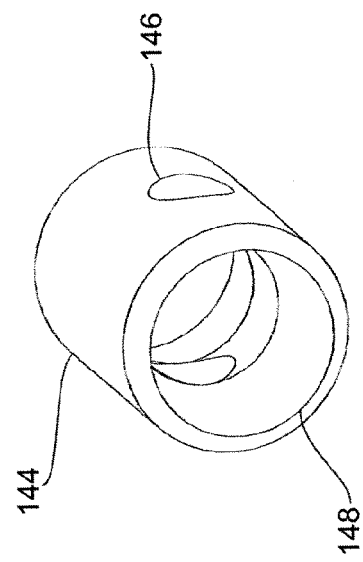
FIG. 12B is a detail view of a bushing forming a portion of the latching assembly in one form.
Figure 13:
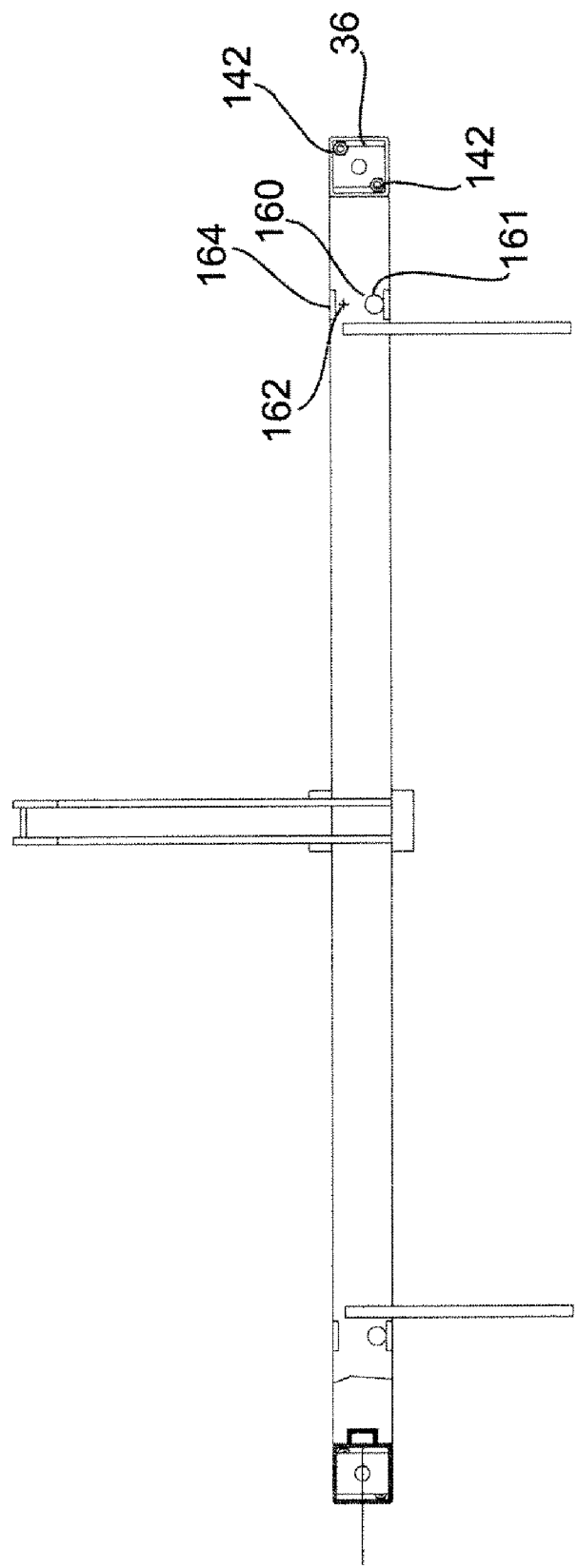
FIG. 13 is a rear view of a modular implement trailer frame in one form.

Looking to FIG. 3, a latching assembly 116 is shown. A single latching assembly 116 is described herein; however, as can be seen in the example of FIG. 3, multiple latching assemblies may be utilized, as shown at each corner of the trailer 20. In one embodiment, the latching assembly comprises components which can be removed from the frame 36 for repair or replacement. This is more easily seen in FIG. 11. As shown, the latching assembly 116 in one form comprises a latch handle 120 which in one form comprises a handle or grasping portion 122, a latching pin portion 124, and a locking portion 126. The latching pin portion 124 is fitted through a cover plate 128 and then passes through a tension member 130, such as a compression spring, a bushing 132, and a washer 134, and is held in place by way of a pin 136 which passes through a pinhole 138 in the latching pin portion 124. This entire assembly is held within the frame 36 in one form by way of a plurality of fasteners 140, which may be connected to a plurality of nuts 142 as shown in FIG. 13. These nuts 142 may be welded or by other means affixed to the frame 36. In this arrangement, the latch handle 120 can be positioned such that the latching pin portion 124 extends through a bushing 144 which may be affixed to the frame 36. To aid in understanding, FIGS. 12A and 12B show one form of this bushing 144. The cutaway view in FIG. 12A shows how the latching pin portion 124 fits through a pin-receiving hole 146 in the bushing 144. Transverse to this pin receiving hole 146 is an implement-receiving hole 148. In one form, the implement-receiving hole 148 comprises a chamfered portion 150 and another chamfered portion 152. The chamfered portions are configured to receive the chamfered pins 154 as shown on the slurry blade of FIG. 10. These chamfered pins 154 also comprise a receiving hole 156. This receiving hole 156 aligns with the pin-receiving hole 146 to receive the latching pin portion 124 of the latch handle 120. In this configuration, the latching assembly 116 temporarily and removably affixes the implement to the frame 36 for use of the implement. Tests have shown that this particular arrangement allows a user to quickly and easily affix the implement to the frame 36 and hold it in position very effectively in use. To affix the bushing 144 in place upon the frame 36, in one form a chamfer 158 (see FIG. 12A) is provided to allow the bushing 144 to be effectively welded in place upon the frame 36. Caution should be exercised to ensure that the pin-receiving hole 146 aligns properly as the bushing 144 is affixed in place.

Looking to FIG. 13, a latch receiver 160 is shown which generally comprises a hole 161 drilled or otherwise provided in the frame 36. Compared to FIG. 11, when the locking portion 126 is fitted into the hole 161, the latch handle 120 is prohibited from rotating, and is also prohibited from releasing the chamfered pins 154 from the latching assembly 116. To release the chamfered pins 154, the grasping portion 122 is held by the user and pulled outward from the frame 36 until the latching pin portion 124 is no longer extending into the bushing 144. The latch handle 120 is then rotated slightly until the locking portion 126 is positioned generally at a released position 162 of FIG. 13. Thus the length of the locking portion 126 maintains the latch handle 120 from the interior portion of the bushing 144. This allows the user to release all of the latching assemblies 116 to remove and replace the implement. In one form, a plurality of rotation preventers 164 are provided which can be seen in FIGS. 11 and 13. Each rotation preventer 164 substantially prevents the latch handle 120 from over-rotating, which may make the overall device difficult to use.

In a more simple form, a very simple latching may be utilized, such as by allowing the chamfered pins 154 to extend all the way through the frame 24, wherein they are held in place by pins, nuts, bolts, or other fasteners. Alternatively, pins or bolts may extend through the frame 24 and pins 154, for example in a longitudinal direction, holding the implement securely to the frame 24.

Of course the latching system may be provided on the implement, and the pins provided on the frame 24 in an embodiment reversed from that shown. This arrangement would require a latching system on each implement, but may be advantageous in some situations.

In the example shown, the majority of the modular implement trailer 24, especially the frame system 24 and hitch system 22, is comprised of extruded metal channel. Of course other materials could be utilized, as well as other configurations such as tubular steel, a c-channel, an i-beam, or other configurations. In one form, enclosed channel steel provides for a very rigid structure, and also forms protection for most of the latching assembly 116 as well as for any conduit to the actuator 54.

Figure 6:
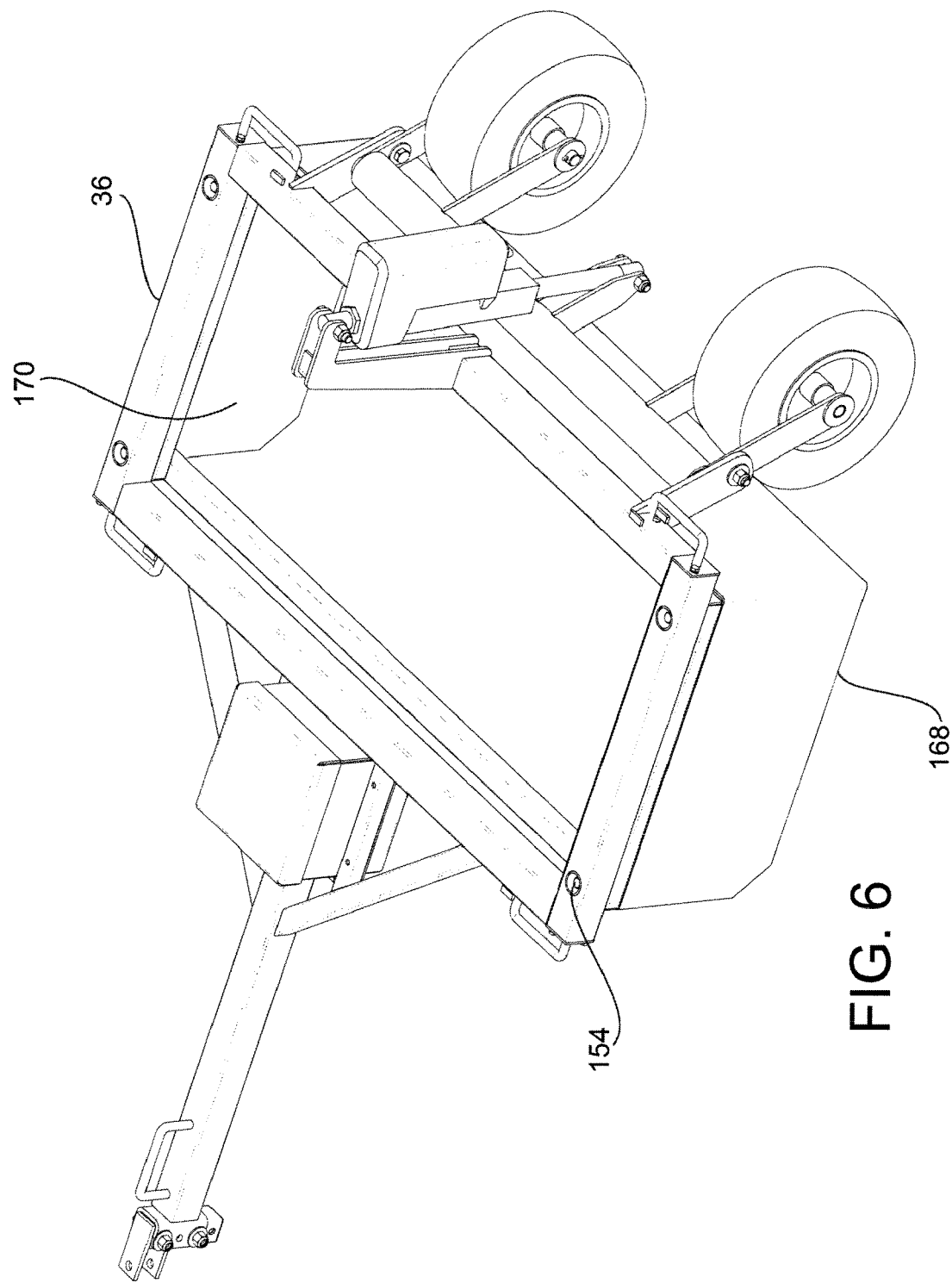
FIG. 6 is an isometric top view of a modular implement trailer with a transport box attached thereto in one form.
Figure 7:
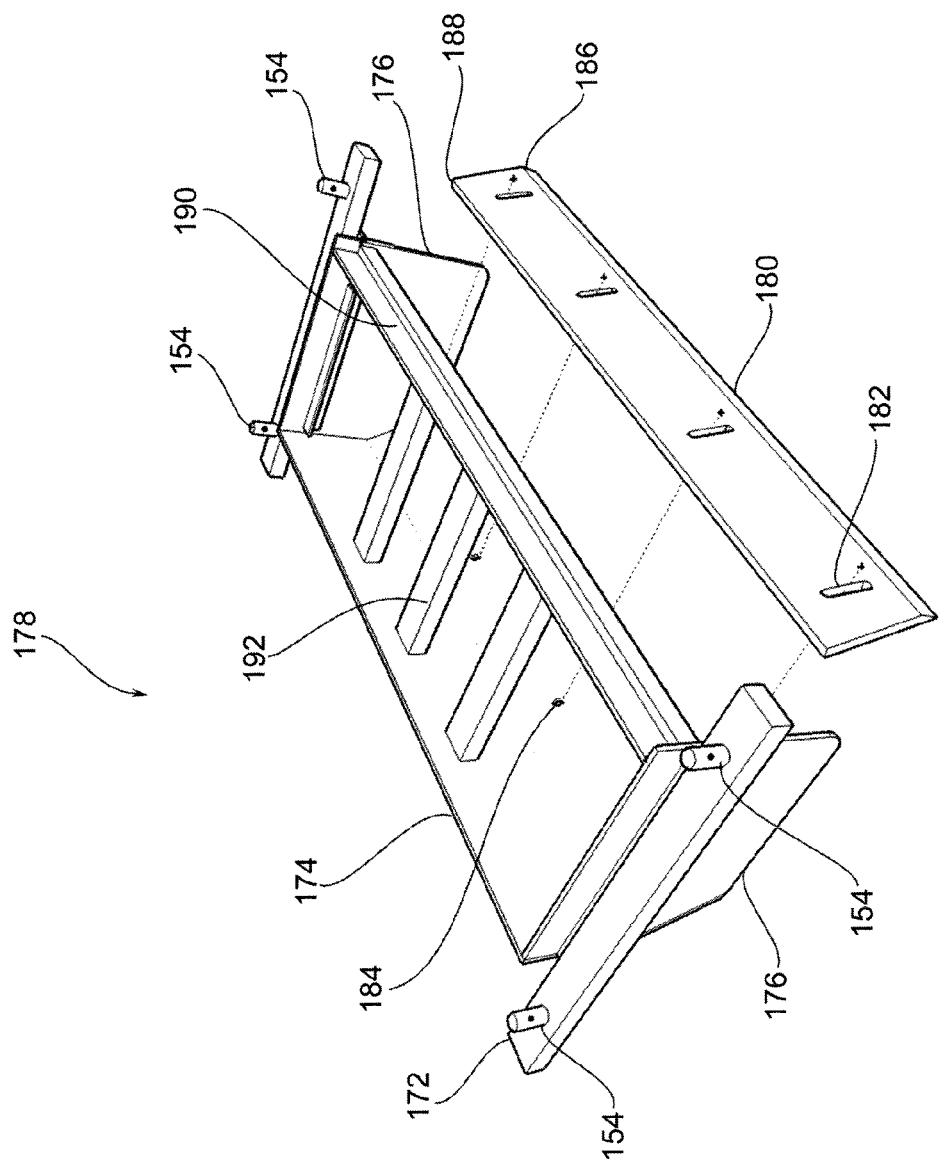
FIG. 7 is an isometric view of a box blade configured to couple to a modular implement trailer in one form.

Multiple implements can be utilized with the modular implement trailer 20 in one form. For example, as shown in FIG. 6, a transport box 168 is shown. This transport box implement 168 can be used to transport any desired material which fits within the interior space 170, such as dirt, seed, manure or any other similar material. Fluids can also be contained therein. As shown, it can be seen how the pins 154 are latched in place as previously described. Looking to FIG. 7, a box blade implement 178 is shown comprising a subframe 172 coupled to the pins 154. In one form, a backplate 174 is attached to the subframe 172, as are a plurality of side plates 176 on either transverse end of the box blade 178. An adjustable blade 180 may be coupled to the backplate 174. The adjustable blade 180 is adjustable in the vertical direction to allow for deeper or shallower cuts. The adjustable blade 180 may utilize a plurality of height adjustment guides 182 which interoperate with fasteners (not shown) and receiving holes 184. The adjustable blade 100 may also be reversible, such that when a first blade portion 186 is worn out, the blade may be reversed top to bottom such that the second edge 188 may be utilized in the downward position. To add rigidity to the overall construction, a front crossmember 190 may be provided which extends between the side plates 176. A plurality of longitudinal stiffeners 192 may be provided between the backplate 174 and the front crossmember 190. When it is desired to add weight to the overall structure, weights may be placed on the longitudinal stiffeners 192, such as sandbags, cinder blocks, or similar weights. Of course the entire box blade implement 178 is operatively configured to mount to the underside of the frame 36 of the modular implement trailer 20.

Figure 8:
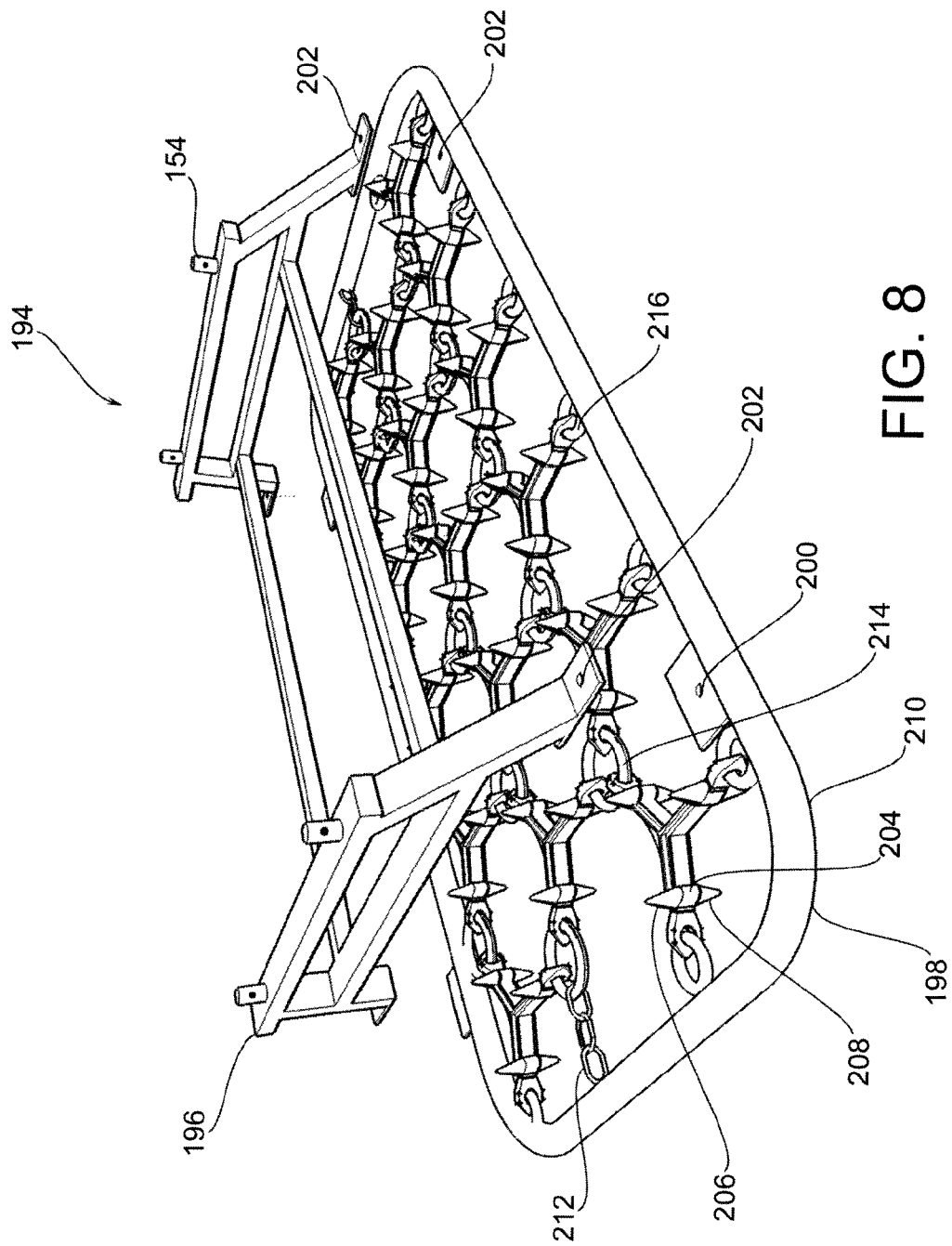
FIG. 8 is an isometric view of a drag harrow configured to couple to a modular implement trailer in one form.

Looking to FIG. 8, a drag harrow implement 194 is shown in one form. The drag harrow 194 generally comprises a subframe 196 operatively configured to couple to the frame 36 of the modular implement trailer 20. The method of connecting the pins 154 to the frame 36 has already been discussed. Also coupled to the subframe 196 is a harrow frame 198, which could be coupled by (for example) bolting through a plurality of holes 200 and 202. By removably affixing the harrow frame 198 to the subframe 196, the harrow frame 198 can be vertically flipped. In one form, the harrow frame 198 comprises a plurality of offset studs 204 which extend vertically from opposite sides of the harrow frame 198. In one form, the studs 204 comprise long extensions 206 and short extensions 208. Thus arranged, the harrow frame 198 can be used with either the long extensions 206, or alternatively the short extensions 208, projecting into the terrain when the drag harrow 194 is in use. In another form, the extensions are of equal length, but the entire set of studs 204, chain sections 212 and steel rings 214 is connected offset from the vertical center of the harrow frame 198 to allow for two different harrowing depths. The entire assembly within these circumferential frames 210 is designed to be substantially loose, as it is not connected but rather is linked by way of (for example) chain sections 212 and steel rings 214 and 216 configured to ride loosely on the surface of the ground when in use.

Figure 9:
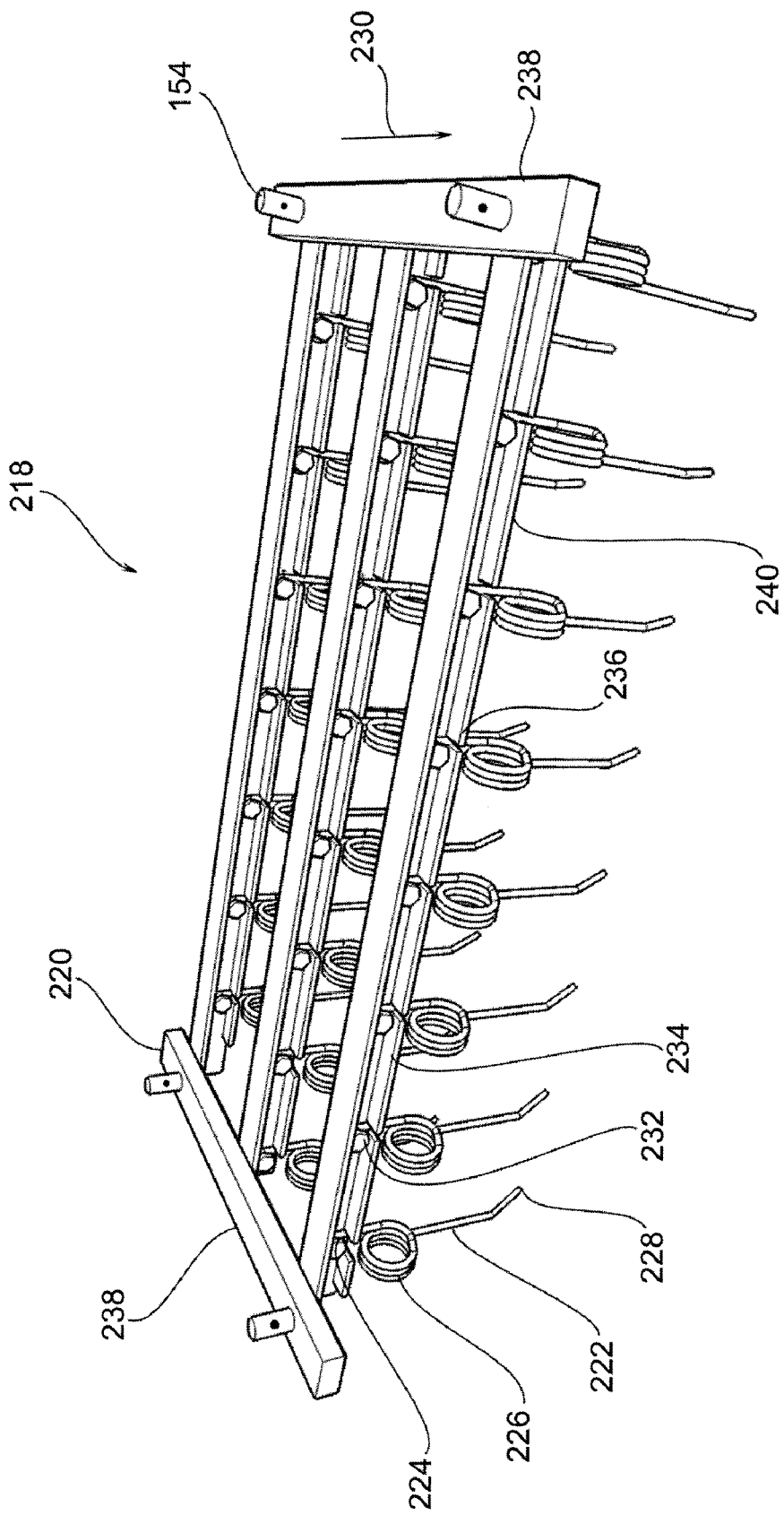
FIG. 9 is an isometric view of a lawn de-thatcher implement configured to couple to a modular implement trailer in one form.

Looking now to FIG. 9, a lawn de-thatcher implement 218 is shown. Once again, the implement comprises a subframe 220 which is operatively configured to couple to the frame 36 of the modular implement trailer 20. The lawn de-thatcher 218 comprises a plurality of tines 222 which each comprise an attachment portion 224, a coil portion 226, and a ground engagement portion 228. As shown, the lawn de-thatcher 218 is designed to be dragged across the ground in a forward direction 230. When in sufficient contact with the ground, the tines 222 release moss, thatch, dead grass and other materials from the surface where they can be removed, or where repositioning of such material increases the growth potential of the surface. As shown, the attachment portion 224 in one form is coupled to the subframe 220 by a plurality of bolts 232. In one form, a guide plate 234 is provided, comprising grooves 236 which function to keep the tines aligned properly. In one form, the guide plate 234 comprises a c-channel which is coupled to the longitudinal members 238 and also functions to receive the bolts 232. To accomplish this, the grooves 236 may be simply cut into the lower portion 240 of the c-channel. The force exerted on the terrain by the tines 222 can be adjusted by means of raising or lowering the actuator 54 previously described.

Figure 10:
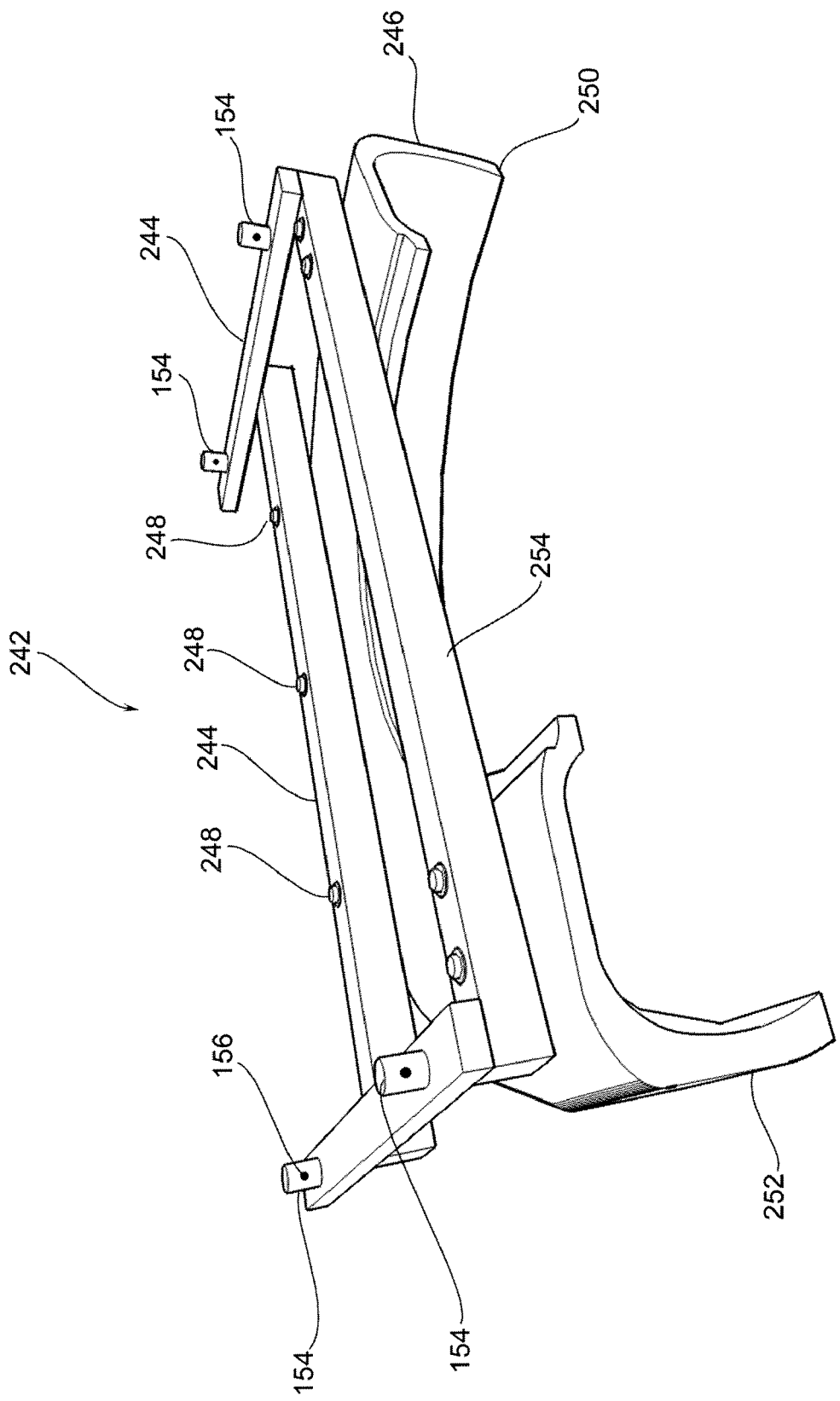
FIG. 10 is an isometric view of a slurry blade configured to couple to a modular implement trailer in one form.

Looking now to FIG. 10, a slurry blade implement 242 is shown comprising a subframe 244 which is operatively configured to couple to the frame 36 of the modular implement trailer 20. Such slurry blades are useful for spreading viscous materials, such as mud and effluent. The slurry blade 242 generally comprises a flexible blade 246 which is coupled to the subframe 244, such as by fasteners 248. In one form, the blade 246 may be comprised of a portion of an automotive tire or the like, wherein the lowermost portion, and part of the radius, is cut away such that the new edge or bottom edge 250 engages the ground surface. To add rigidity to the overall structure, rigid members can be attached from the outer wall 252 to the crossmember 254. While these rigid members are not shown, they could be easily adapted, such as by bolting through the outer wall 252 and welding, clipping, or bolting to the crossmember 254. Once again, the actuator 54 can be utilized to increase or reduce pressure between the bottom edge 250 of the blade 246 and the terrain.

Other implements also be utilized, some of which may mount to the upper surface 256 of the frame 36 as shown in FIG. 1. Such top mounted implements may include tank sprayers, carrying boxes, flatbed units, and the like.

Figure 14:
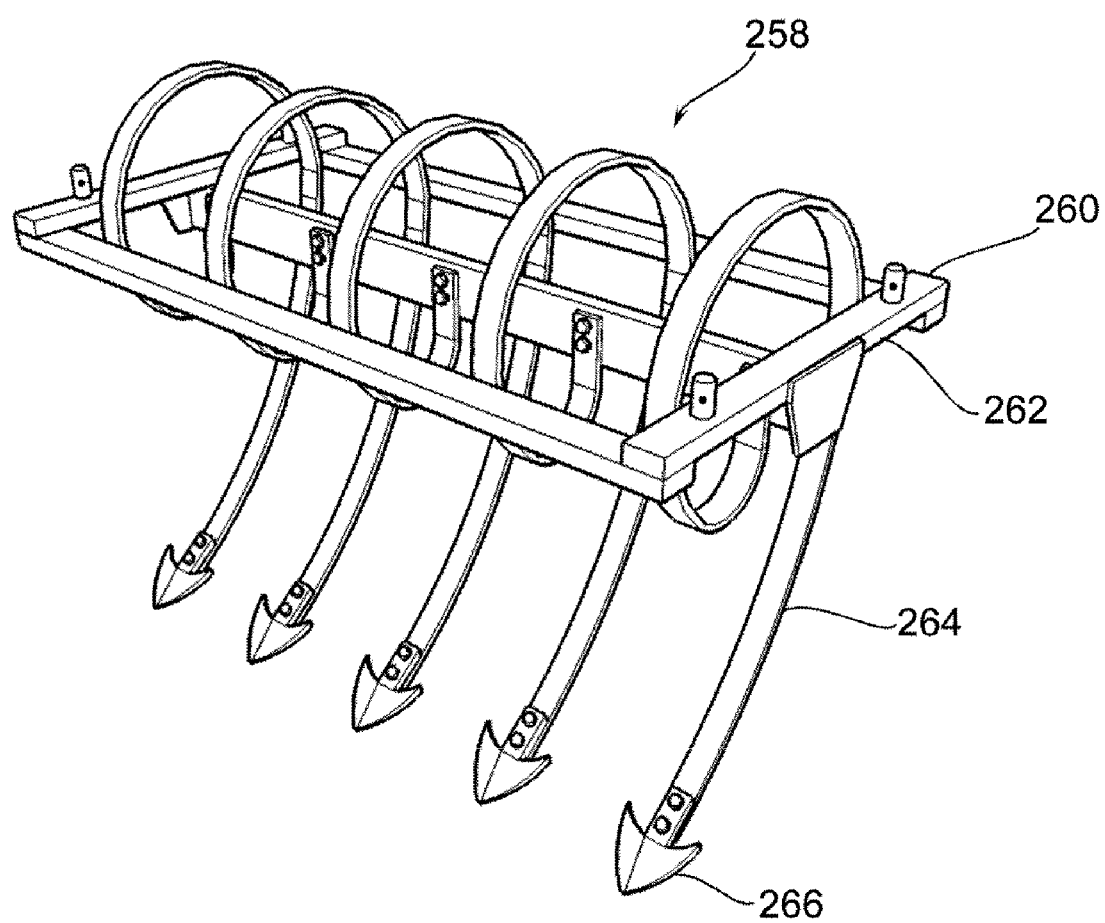
FIG. 14 is an isometric view of a cultivator implement configured to couple to a modular implement trailer in one form.

The implement in FIG. 14 is a cultivator 258 which is operatively configured to be attached to the frame as previously described. As shown, the cultivator 258 comprises a subframe 260 which attaches either to the underside or alternatively to the upper side of the frame 36 of the modular implement trailer 20. In one form, a crossmember 262 is coupled to the subframe 260. A plurality of cultivator shanks 264 are coupled to the crossmember 262 to extend into the earth, and may further comprise a plurality of cultivator shovels or spring teeth 266.

Figure 5:
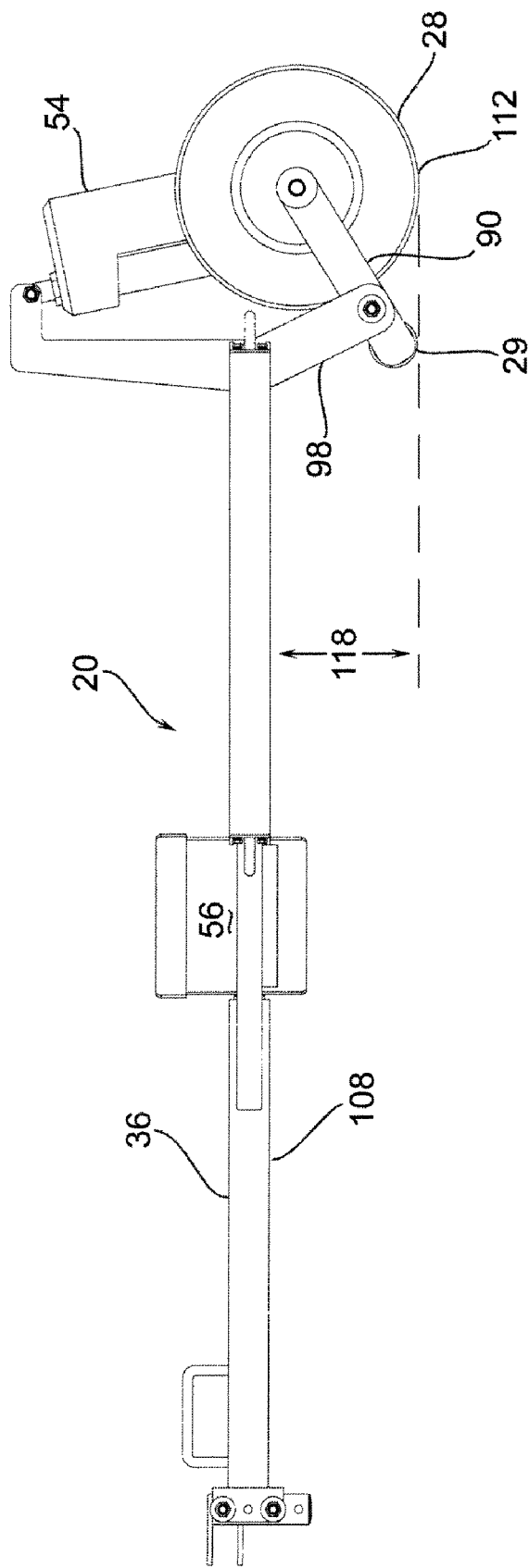
FIG. 5 is a side view of a modular implement trailer in one form, in a lowered configuration.
Figure 15:
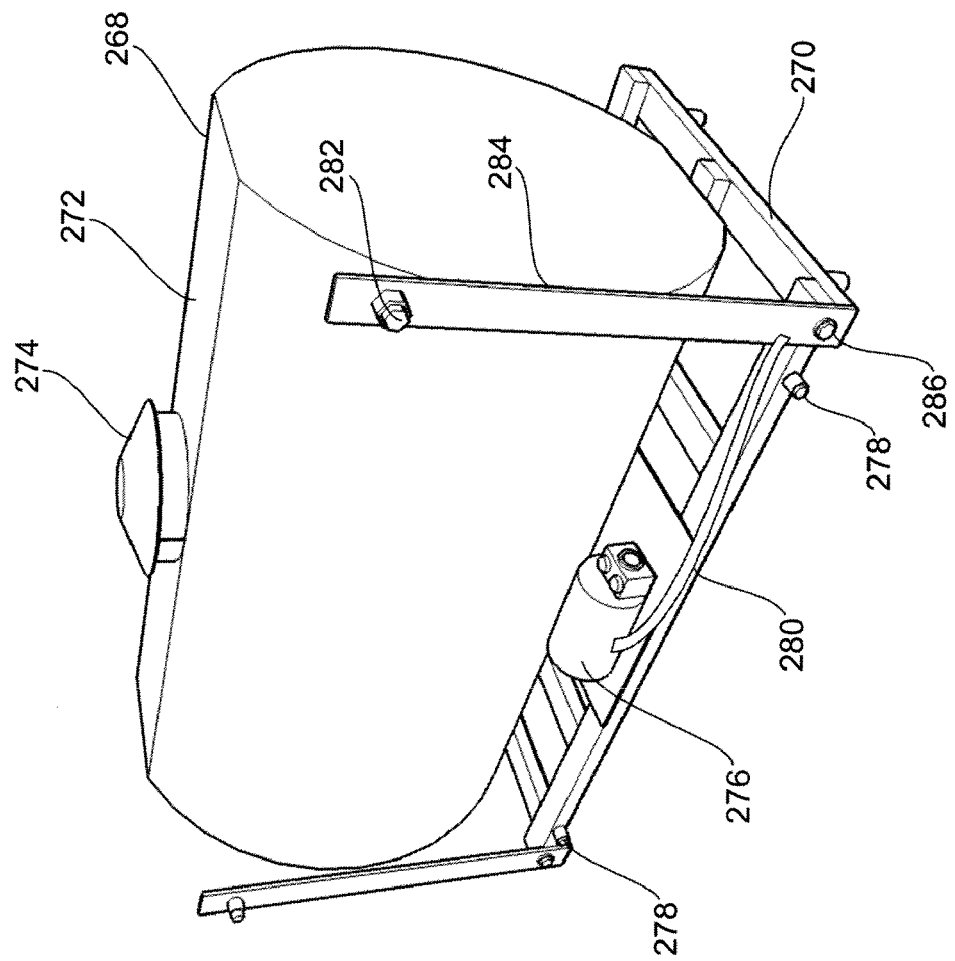
FIG. 15 is an isometric view of a tank/sprayer implement configured to couple to a modular implement trailer in one form.

The modular implement shown in FIG. 5 is a tank/sprayer 268 in one form. In one form, the tank/sprayer 268 comprises a subframe 270 operatively configured to be attached to the frame 36 of the modular implement trailer 20 as previously described. This implement generally comprises a tank 272 including a fill hole 274. A pump 276 may be included and may be connected to the power supply of the trailer, or alternatively to the power supply of a vehicle. The device may also be gravity-fed. In one form, the nozzles 278 may be coupled to the subframe 270 and fluidly coupled to the pump 276 by way of a hose 280. In one embodiment, an additional plurality of nozzles 282 are coupled to spray arms 284, which are positionably coupled to the subframe 270 to raise to a storage position as shown in FIG. 15, or may alternatively be rotated about a pivot 286 to an extended, useful position. Of course, other repositioning methods could be utilized for the spray arms 284.

Figure 16:
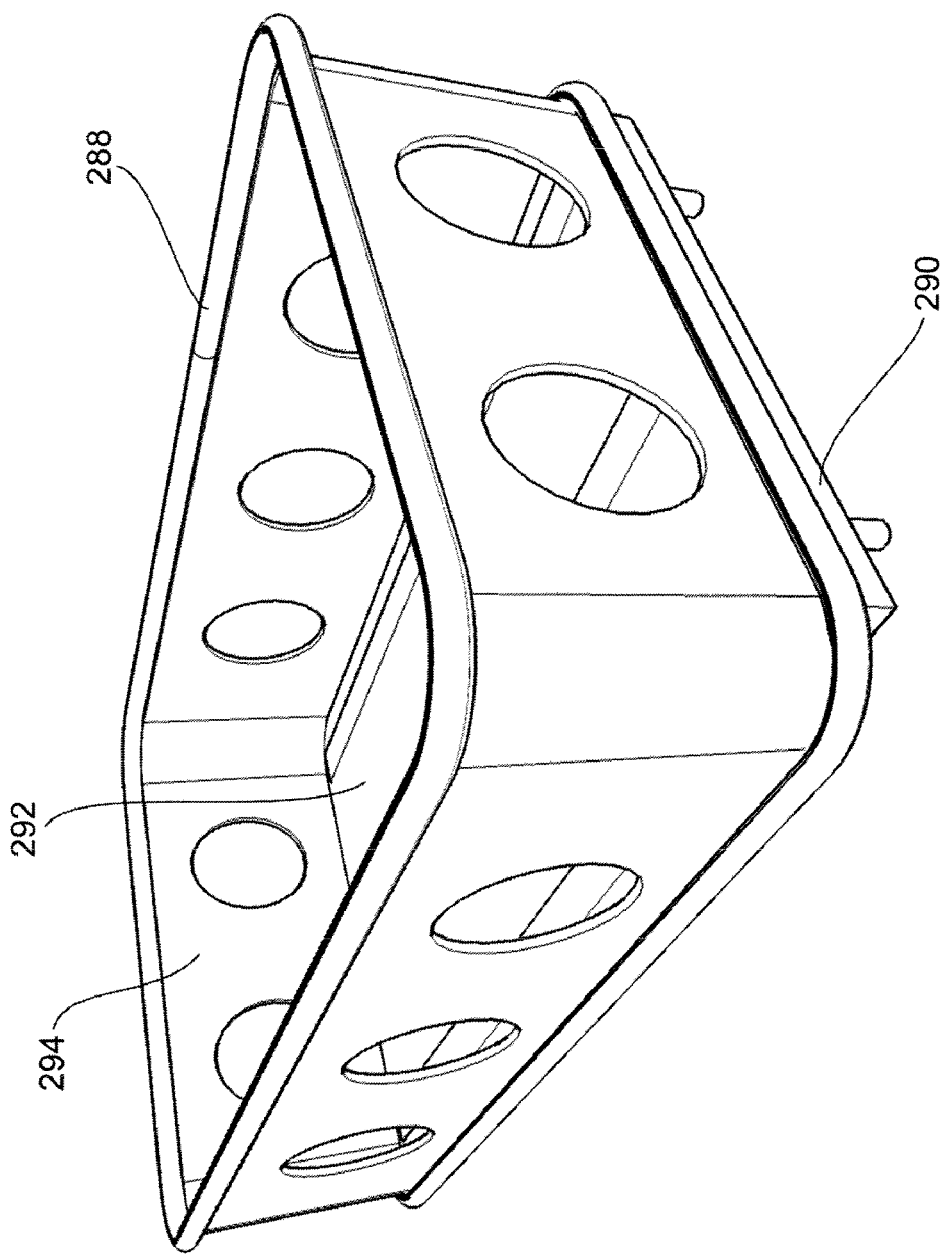
FIG. 16 is an isometric view of a utility box implement configured to couple to a modular implement trailer in one form.

The modular implement shown in FIG. 16 is a utility box 288. The utility box 288 comprises a subframe 290 operatively configured to be attached to the frame 36 of the modular implement 20, as previously described. In one form, the utility box 288 attaches to the upper portion of the frame 36. As the utility box 288 is used for carrying various tools and materials, the utility box 288 comprises a solid or perforated bottom 292 and solid or perforated sidewalls 294. Of course a lid or other structures could be utilized.

One modular implement shown in FIG. 17 is a roller 296, which is often used to flatten or smooth lawns, gardens, fields, and similar areas. The implement generally comprises a roller body 298 coupled to a subframe 300 through a pillow block 302 and bearing 304. The subframe 300 is operatively configured to be attached to the frame 36 of the modular implement 20, as previously described.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A modular implement trailer comprising:
   a) a hitch operatively configured to couple to a vehicle;
   b) a trailer frame coupled to the hitch;
   c) a plurality of trailer wheels positionably coupled to the trailer frame;
   d) a modular receiving unit portion of the frame, the modular receiving unit operatively configured to fixedly and removably couple various independent implements to the trailer frame;
   e) a latching assembly coupled to the frame and operatively configured to fixedly and removably couple an implement to the trailer frame;
   wherein the latching assembly comprises:
   a latch handle;
   a tension member coupled to the latch handle;
   wherein the tension member is operatively configured to maintain the latching assembly in a locked orientation;
   a bushing comprising a first surface defining a first void operatively configured to receive a portion the implement;

f) wherein the modular receiving unit is positioned between the hitch and the trailer wheels; and g) a height adjustment system operatively configured to allow a user to adjust the height between the trailer frame adjacent to the trailer wheels, and the lowermost position of the trailer wheels.

2. The modular implement trailer as recited in claim 1 further wherein the height adjustment system comprises:

a) an actuator having a first end coupled to the frame, and b) a second end of the actuator coupled to the trailer wheels.

3. The modular implement trailer as recited in claim 2 further comprising a remote control unit coupled to the actuator and operatively configured to control the actuator wherein the remote control unit is positionable to be controlled by a user upon the vehicle.

4. The modular implement trailer as recited in claim 2 further comprising a power supply coupled to the trailer frame and operatively configured to allow use of the actuator independently from the vehicle.

5. The modular implement trailer as recited in claim 1 wherein the latching assembly is operatively configured to receive implements on a bottom and a top portion of the frame.

6. The modular implement trailer as recited in claim 1 wherein the latching assembly is substantially positioned within the frame.

7. The modular implement trailer as recited in claim 1 wherein the implement is selected from the list comprising: a spreader, cultivator, box blade, aerator, slurry blade, thatcher, harrow, roller, and tank sprayer.

8. The modular implement trailer as recited in claim 1 wherein the implement comprises a thatcher which further comprises:

a) a plurality of removable and replaceable tines; and b) a sub frame operatively configured to removably couple to the trailer frame comprising at least one alignment groove for each tine.

9. The modular implement trailer as recited in claim 1 wherein the implement comprises a drag harrow further comprising:

a) a sub frame operatively configured to removably couple to the trailer frame;

b) a harrow frame operably configured to removably couple to the sub frame; and c) the harrow frame comprising a plurality of harrow studs extending from the harrow frame.

10. The modular implement trailer as recited in claim 9 wherein the harrow studs comprise:

a) a median connective portion coupled to the harrow frame;

b) a plurality of short extensions extending substantially perpendicular in a first direction;

c) a plurality of long extensions extending in a second direction, the second direction being opposite the first direction; and d) the harrow frame being operatively configured to extend either the short extensions or the long extensions from the harrow.

11. The modular implement trailer as recited in claim 1, wherein;

a) the bushing is fixedly coupled to the trailer frame;

b) the bushing comprises a second surface defining a second void perpendicular to the first surface defining the first void, c) the second surface defining the second void operatively configured to receive a portion of the latch handle; and d) wherein the latching assembly is operatively configured to fixedly couple the implement to the trailer frame as the portion of the implement is positioned within the first surface defining the first void, and the handle is positioned within the second surface defining the second void.

* * * * *